Feb. 14, 1950 — J. A. CONTI — 2,497,393
BABY WALKER
Filed April 16, 1946 — 3 Sheets-Sheet 1

INVENTOR.
John A. Conti
BY his Atty

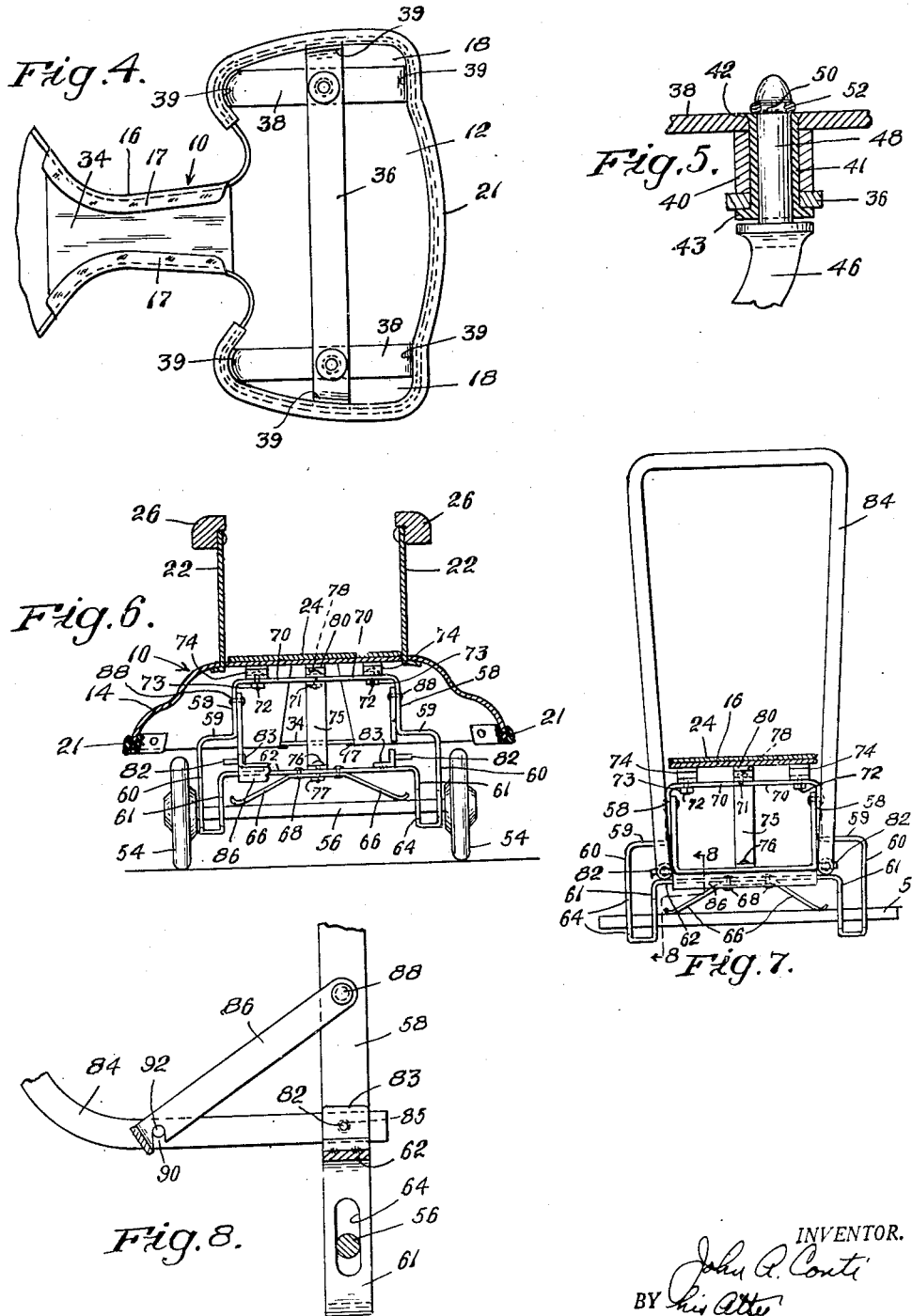

Feb. 14, 1950 J. A. CONTI 2,497,393
BABY WALKER

Filed April 16, 1946 3 Sheets-Sheet 3

INVENTOR.
John A. Conti
BY his Atty
John H. McKenna

Patented Feb. 14, 1950

2,497,393

UNITED STATES PATENT OFFICE 2,497,393

BABY WALKER

John A. Conti, Gardner, Mass., assignor to Hedstrom-Union Company, Gardner, Mass., a corporation of Massachusetts Application April 16, 1946, Serial No. 662,591

6 Claims. (Cl. 155—22)

This invention relates to improvements in baby walkers and the like.

More particularly it relates to baby walkers having stamped sheet metal bodies mounted on wheels, and having readily insertible pusher handles for converting the walkers into vehicles in the nature of strollers.

The invention provides improvements in the sheet metal body structure whereby relatively thin sheet metal may be employed and wherein welded structural elements introduce needed strength against collapse of the sheet body in use, and facilitate assembly and mounting of the body on its wheels.

It is among the objects of the invention to provide a baby walker having a unitary stamped sheet metal body including a relatively narrow welded sheet metal tubular backbone portion integrally connecting laterally spread front and rear shell portions of the body. The back-bone portion is pressed or stamped into a relatively narrow inverted channel shape, and the open side of the channel is closed by a stiffening plate welded to the opposite edges of the channel, thereby to provide an exceedingly strong though suitably narrow connecting back-bone structure which readily may be straddled in use of the walker.

Another object is to provide a baby walker having a laterally spread shell forepart of the body pressed or stamped as a part of an integral sheet metal body and having spaced and crossing rigid bars welded interiorly of the shell forepart and rigidly mounting bearing sleeves in which the shanks of front wheel forks are rotatably mounted, with said bars effectively maintaining the spread shape at the forepart against collapse in use of the walker.

Still another object is to provide a baby walker having an integral stamped sheet metal body and having an improved suspension of a rear wheel axle.

Yet another object is to provide a baby walker having improved means for connection thereto of a pusher handle. I provide permanent projecting pins welded in place on the rear axle frame on which perforated ends of the arms of a pusher handle may be resiliently engaged, there being additional retaining means for holding the pusher handle rigid.

It is, moreover, my purpose and object generally to improve the structure and aesthetic appearance of baby walkers and the like.

In the accompanying drawings:

Fig. 4 is a bottom plan view of the front part and mid-part of the baby walker of Figs. 1-3, with the front wheels omitted;

Fig. 5 is a detail view of one of the bearing sleeves for the front wheels;

Fig. 6 is a rear elevation of the baby walker with the sheet metal body in cross section;

Fig. 7 is a rear elevation with the body and wheels omitted and showing a pusher handle mounted on the axle supporting frame;

Fig. 8 is a cross-sectional view on line 8—8 of Fig. 7;

Figure 10:
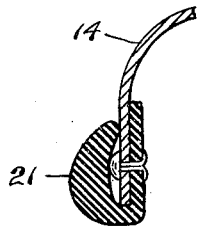
Fig. 10 is an enlarged detail cross-sectional view of the bumper strip, as on line 10—10 of Fig. 1.
Figure 11:
Fig. 11 is an enlarged medial cross-sectional view through one of the hand grips.

Referring to the drawings, the body 10 preferably is a sheet metal stamping which, in plan, has the general shape of the letter H, with front and rear laterally spread shell portions 12, 14 integrally connected by the relatively narrow inverted channel portion 16. The front shell portion includes the front fenders 18 at opposite sides, and the rear shell portion includes the rear fenders 20 at opposite sides. Bumper strips 21, of rubber or other suitable material, are provided at the front and rear, covering the raw edges of the sheet metal body as best seen in Fig. 10.

A back rest 22 is mounted on the top rear of the body, being generally arcuate in shape for defining the rear portion 24 of the top surface of the body which constitutes the seat. A generally arcuate top frame 26 of wood or the like is secured around the top edge of back rest 22, and a tubular member 28 has its opposite ends mounted in the ends of the arcuate frame 26 and defining a loop of substantial dimensions forwardly of the frame 26. The forward portion of the loop is supported on a member 30 rising from the front shell portion 12 of the body. The member 30 may be of wood or of any other suitably rigid material. A tray 32 rests on the tubular member 28 and is secured as by screws 29 to the member 30, being suitably spaced forwardly of and above the seat portion 24.

Figure 1:
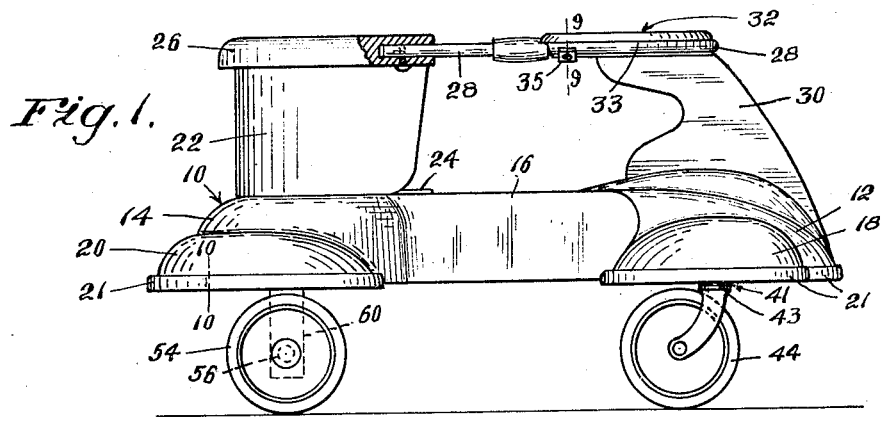
Fig. 1 is a side elevation of a baby walker embodying features of my present invention.
Figure 2:
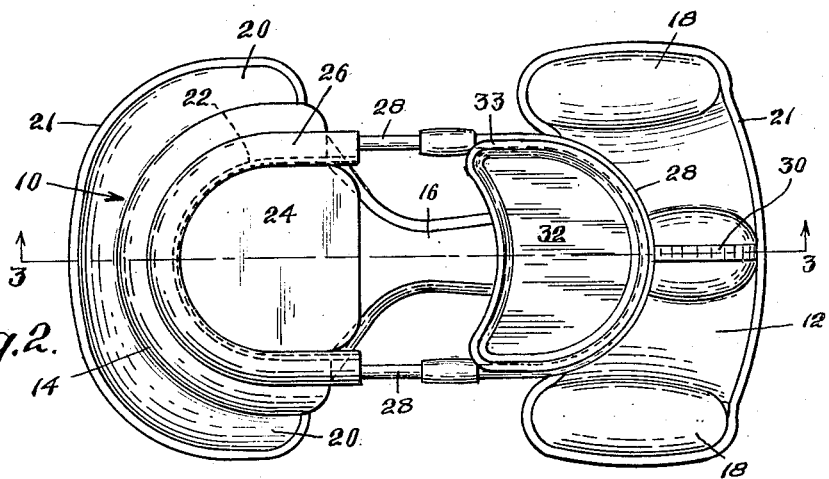
Fig. 2 is a top plan of the baby walker of Fig. 1.
Figure 3:
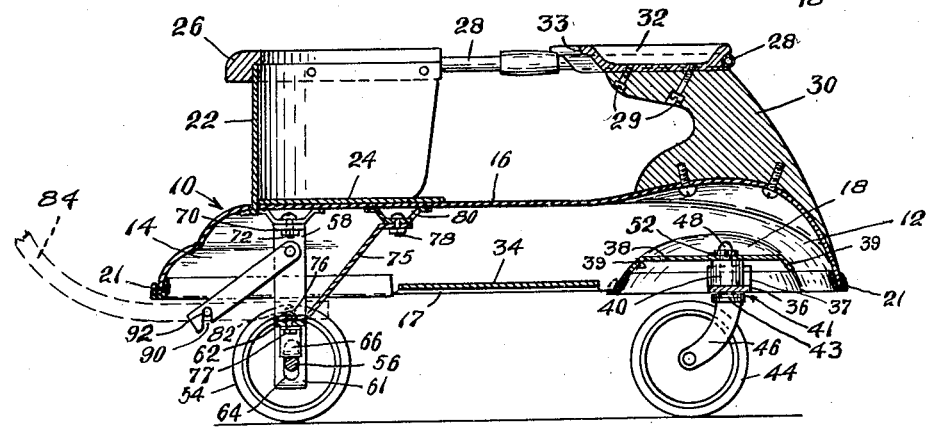
Fig. 3 is a medial longitudinal section on line 3—3 of Fig. 2.
Figure 9:
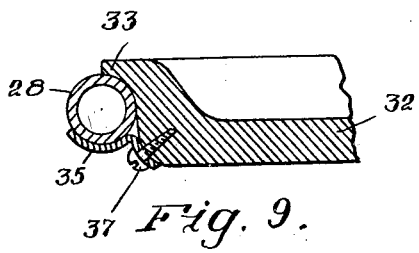
Fig. 9 is an enlarged detail cross-sectional view on line 9—9 of Fig. 1.

As shown in Fig. 1 and in the detail showing of Fig. 9, the tray 32 sets within the forward loop of the tubular member 28, being flanged at its upper edge as at 33 for resting on member 28. A spring metal clip 35 at each side of the tray is secured to the tray as by screw 37 and engages around the under side of tubular member 28 for securing the tray in place seated on member 28. Thus the tray constitutes a substantial rigid strut across the forward loop of member 28 stiffening said member and generally improving the rigidity and strength of the upper structure of the vehicle.

According to the invention, the relatively narrow inverted channel connecting portion 16 has its marginal edges at 17 (Fig. 4) turned slightly inward and over upon a rigid plate 34 whose opposite margins are welded to the turned over portions 17 of the channel margins. Plate 34 extends substantially throughout the extent of the inverted channel portion 16, closing the open side of the channel and converting the channel into a structurally rigid tube which is in effect the back-bone of the vehicle.

The front laterally spread shell portion 12 of the body is provided interiorly on its under side with a rigid bar 36 which extends from side to side of the shell, with its opposite ends bent at 39 for resting flatwise against the side walls of the front fenders 18. Each bent end 39 is spot welded to the side wall of the adjacent fender 18.

A shorter rigid bar 38 extends longitudinally within each fender 18, crossing the longer bar but appreciably spaced therefrom. The opposite ends of each bar 38 are bent at 39 for resting flatwise respectively against the forward and rear end walls of the fenders, and the bent ends are spot welded to the fender walls.

At each region of crossing of the bars 36, 38, a spacing sleeve 40 is vertically disposed between the bars and a bearing bushing 41 extends through both bars 36, 38 and through sleeve 40, the bushing having a flange 43 at its lower end for resting against bar 36, and its upper end being swaged at 42 or otherwise headed over upon the bar 38, thus clamping the bars 36, 38 against the opposite ends of sleeve 40. As herein represented, each front wheel 44 is rotatably mounted in a fork or yoke 46 whose shank 48 extends upward through one of the bearing bushings 41, the upper end of each shank 48 having an annular groove 50 therein for reception of a split resilient retained ring 52.

The rear wheels 54 are mounted on an axle 56 which is supported below the rear shell portion 14 of the body by a depending frame of rigid bar metal. The frame conveniently may be formed of an integral strip or bar bent to provide two parallel vertical portions 58, each turned sharply outward at 59 and then downward and then inwardly and then upward to provide slightly spaced vertical axle supporting legs 60, 61 adjacent to each wheel 54. The legs 61 extend integrally into a horizontal bar portion 62 which extends between the legs 61 spaced appreciably above the axle 56. The legs 60, 61 adjacent to each wheel are vertically slotted at 64 for passage therethrough of the axle, and a leaf spring 66 between horizontal bar 62 and the axle biases the axle 56 toward the lower ends of the slots 64. However, the axle can yield resiliently upward against the bias of the spring, with the spring absorbing and dissipating shocks which otherwise would be transmitted directly to the body 10. The spring may be pinned or bolted at 68 to the horizontal bar 62.

It is a feature that the axle supporting frame is secured to body 10 without any screws or bolts extending through the seat portion 24. Each of the vertical bars 58 is formed at its upper end with a horizontal foot part 70 which may extend into end abutting engagement with the other foot 70, and the abutting ends may be left free of connection to each other but preferably will be spot welded together as at 71 to increase rigidity of the frame. Each foot 70 is bolted to the under side of body 10 by a bolt 72 which is suspended from a metal strip 74 welded to the under side of body 10, each strip having a depressed mid-portion for accommodating the head of the bolt between the strip and the body 10. The strips 74 may be welded to the body, with the bolt positioned in each, at such time as may be most convenient and economical, so that assembly of the body and rear axle frame may be quickly and simply accomplished by merely receiving in perforations on the feet 70 the already held bolts 72 and screwing a nut 73 on each bolt. A brace bar 75 has its lower end secured to horizontal bar 62 by a bolt 76 which may extend through the brace bar, bar 62 and leaf spring 66, with a nut 77 clamping all of these elements together. The brace bar extends diagonally from bar 62 to a forward location under seat 24 where its upper end is bolted as at 78 to a metal strip 80 which has a depressed mid-portion for seating the head of the bolt and has its opposite end portions spot welded to body 10. By this structure, the axle frame is rigidly supported and braced to provide a durably strong resilient suspension of axle 56.

It frequently is desirable to convert such baby walkers, for use as vehicles in the nature of strollers, by attaching a suitable pusher handle at the rear and providing a foot rest which may be removably supported at the rear on the rear axle and forwardly on some suitable part of the under structure of body 10. My present baby walker is provided with a pair of projecting pins 82 on the brackets 83 which may be spot welded to horizontal bar 62. A generally U-shaped tubular pusher 84 has a transverse hole 85 at the free end of each U-arm and the arms are resiliently spreadable at their free ends to engage the pins 82 in the holes 85 of the arms with the resiliency of the arms urging them toward each other to maintain them on the pins. The pusher thus is readily attachable to the vehicle without need for aligning holes for reception of a bolt. The pins 82 are fixed and all that is necessary is to spread the pusher arms enough to engage the pins in the arm holes 85. A generally U-shaped member 86 is pivoted on vertical bars 58 as at 88 and has notches 90 for engaging projecting pins 92 in the pusher arms to maintain the handle rigid in use.

Any suitable removable foot rest (not shown) may be mounted on the rear axle and the front bar 36 when the vehicle is converted by attachment of pusher 84.

Figure 12:
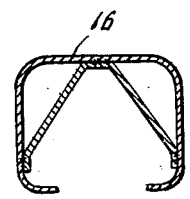
Figs. 12 through 16 are cross-sectional views showing modified forms of back-bone structure for the integral sheet body.
Figure 13:
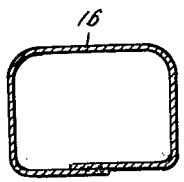
Figure 14:
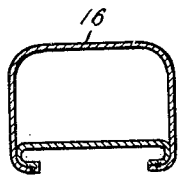
Figure 15:
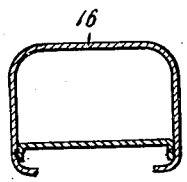
Figure 16:
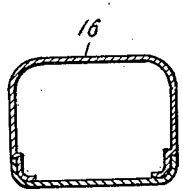

It will be obvious from the foregoing description that I have provided a baby walker whose body may be stamped economically in integral sheet metal form, with the required laterally spreading front and rear parts and a relatively narrow connecting or back-bone which readily may be straddled by the user of the vehicle and which, notwithstanding its limited dimensions, can have needed strength and durability because of the disclosed tubular welded structure of the back-bone. However, if desired, the portion 16 of the body may have its edges brought around and welded together as in Fig. 13, or the edge portions of the tube 16 may be connected together by plate elements as in Figs. 14–16. Also, in some cases, it may be desirable to have the portion 16 interiorly braced and reinforced as suggested in Fig. 12, without employing my preferred tubular construction, and without getting all of the advantages of a tubular construction.

Durability and strength attainable economically and on principles of mass production are essential considerations in the manufacture of baby walkers and other children's vehicles. My present invention provides structural improvements whereby the disclosed integral sheet metal body may be employed effectively and economically in conjunction with my improved body strengthening wheel-mounting means which provides needed rigidity of wheel support in conjunction with needed sheet body sustaining brace bars. Also, an effective yet simple rear-axle suspension provides shock-absorbing qualities in an economical manner, and provides for ready attachment of a pusher handle for conversion of the vehicle quickly and effective.

I claim as my invention:

1. In a baby walker, an integral stamped sheet metal body having generally the shape of the latter H with the connecting bar of the H generally of inverted channel shape and with each of the parallel arms of the H formed as shell with a fender at its opposite ends, a plate welded to the opposite edge margins of said inverted channel bar and closing the open side of the channel, a back rest and tray mounted in spaced relation on said body, depending means within the shell of one of said parallel arms of the H for supporting a rear axle, a rigid bar welded at its opposite ends within the shell of the other parallel arm of the H, a rigid shorter bar welded at its opposite ends within each front fender of the latter said arm and extending crosswise of the first mentioned bar, a bearing bushing extending vertically between and secured to said crossing bars at their regions of crossing within each front fender, and a wheel swivelly mounted in each said bearing sleeve.

2. In a baby walker having a stamped integral sheet body including laterally spread front and rear shell portions and a relatively narrow inverted channel shaped integral connecting portion, a plate welded to opposite edge margins of said connecting portion of the body and closing the open side of the inverted channel throughout substantially its full extent between said front and rear shell portions, means within the rear shell portion of the body for supporting a rear axle with wheels thereon, a rigid bar extending within the front shell portion from side to side thereof and welded at its opposite ends interiorly to the shell, a rigid shorter bar extending within said front shell at each side thereof and crossing the first mentioned bar, said shorter bars being welded at their opposite ends interiorly to the shell, a bearing bushing extending vertically between and secured to said crossing bars at the regions of their crossing, and a wheel swivelly mounted in each of said bearing sleeves.

3. In a baby walker having an integral sheet metal shell body, wheel supporting means within said shell at one end of the body, comprising a rigid bar extending from side to side of the shell and welded at its opposite ends to the interior of the shell, two shorter rigid bars, one at each side of the shell, each said shorter bar extending in spaced relation crosswise of the longer bar and being welded at its opposite ends to the interior of the shell, a spacing sleeve at each region of crossing of said bars, each sleeve extending vertically between the bars with its opposite ends engaging the bars, a bearing bushing extending through each said bar and through each said sleeve, means at opposite ends of the bushing securing said sleeve under endwise compression between the bars, and a wheel swivelly mounted in each said bearing bushing.

4. In a baby walker having an integral sheet metal shell body, wheel supporting means within said shell at one end of the body, comprising a frame of bar metal including vertical portions integral therewith and horizontal foot portions integral therewith, a strip of metal welded to the under side of said body adjacent each said foot portion of frame, each strip having a depressed mid part for accommodating a bolt head between itself and the body, a bolt suspended from each said welded strip, each said foot of the frame having a perforation therein for receiving one of said bolts, and a nut on each bolt securing one of said foot portions against one of said welded strips.

5. In a baby walker having an integral sheet metal shell body, wheel supporting means within said shell at one end of the body, comprising a depending frame including two outer parallel vertical portions and two inner parallel vertical portions, with a horizontal portion connecting said inner vertical portions, each of said vertical portions having a vertical slot therein for passage therethrough of an axle, an axle extending through said slots and steadied at four locations therealong by the said vertical portions of the frame, a leaf spring secured to said horizontal portion of the frame at a mid-location along the spring and having its opposite end portions resiliently engaging said axle and yieldably urging the axle toward the lower ends of said slots, and a pair of laterally projecting pins mounted on said horizontal portion of the frame for removably maintaining a pusher handle in operative relation to the shell body.

6. In a baby walker having an integral sheet metal shell body, wheel supporting means within said shell at one end of the body, comprising a depending frame including parallel vertical portions each with an integral horizontal foot thereon at its upper end, said vertical portions being connected toward their lower ends by an integral horizontal portion of the frame, a brace bar connected at one end to the horizontal portion of frame and having an angularly disposed foot at its other end, a rigid metal strip welded to the shell adjacent each of said horizontal feet of the vertical portions of frame and adjacent said angularly disposed foot of said brace bar, each said strip being welded at each end to the shell with a mid-portion of each welded strip spaced from the shell, a bolt extending through said mid-portion of each strip with the bolt heads within the said spaces between the strips and the shell, said horizontal feet on the vertical portions of frame and said angularly disposed foot on said brace bar each being secured on the outer end of a said bolt, whereby the frame is rigidly secured to the shell body.

JOHN A. CONTI.

REFERENCES CITED

The following references are of record in the file of this patent:

UNITED STATES PATENTS

| Number | Name | Date |
|---|---|---|
| 1,638,426 | Wilson | Aug. 6, 1927 |
| 1,737,618 | Siebert | Dec. 3, 1929 |
| 1,790,195 | Baker | Jan. 27, 1931 |
| 1,960,156 | Kelly | May 22, 1934 |
| 2,422,241 | Johnson | June 17, 1947 |

FOREIGN PATENTS

| Number | Country | Date |
|---|---|---|
| 349,929 | Germany | Dec. 9, 1920 |
| 540,589 | France | Apr. 20, 1922 |